United States Patent
Hsu et al.

(10) Patent No.: US 9,458,989 B2
(45) Date of Patent: Oct. 4, 2016

(54) METHODS AND APPARATUS FOR TRANSPARENT DISPLAY USING UP-CONVERTING NANOPARTICLES

(71) Applicants: Chia Wei Hsu, Cambridge, MA (US); Wenjun Qiu, Cambridge, MA (US); Bo Zhen, Cambridge, MA (US); Ofer Shapira, Cambridge, MA (US); Marin Soljacic, Belmont, MA (US)

(72) Inventors: Chia Wei Hsu, Cambridge, MA (US); Wenjun Qiu, Cambridge, MA (US); Bo Zhen, Cambridge, MA (US); Ofer Shapira, Cambridge, MA (US); Marin Soljacic, Belmont, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 0 days.

(21) Appl. No.: 14/143,558

(22) Filed: Dec. 30, 2013

(65) Prior Publication Data

US 2014/0185284 A1     Jul. 3, 2014

Related U.S. Application Data

(60) Provisional application No. 61/748,228, filed on Jan. 2, 2013, provisional application No. 61/748,259, filed on Jan. 2, 2013, provisional application No. 61/866,468, filed on Aug. 15, 2013.

(51) Int. Cl.
*F21V 9/12* (2006.01)
*F21V 9/08* (2006.01)
(Continued)

(52) U.S. Cl.
CPC . *F21V 9/12* (2013.01); *F21V 9/08* (2013.01); *G02F 1/0126* (2013.01); *G02F 1/19* (2013.01); *G09F 13/00* (2013.01); *B82Y 20/00* (2013.01); *Y10S 977/773* (2013.01)

(58) Field of Classification Search
CPC ................................................. H04N 13/049
See application file for complete search history.

(56) References Cited

U.S. PATENT DOCUMENTS 4,870,485 A * 9/1989 Downing et al. .............. 348/42
5,764,403 A * 6/1998 Downing ..................... 359/326
(Continued)

FOREIGN PATENT DOCUMENTS

CN      101872068 A     10/2010
KR   10-2008-0082783      9/2008
(Continued)

OTHER PUBLICATIONS

Fan Zhang; "Formation of Hollow Upconversion Rare-Earth Fluoride Nanospheres: Nanoscale Kirkendall Effect During Ion Exchange"; Chem. Mater. 2009, 21, 5237-5243; Received Jul. 21, 2009. Revised Manuscript Received Sep. 22, 2009.*
(Continued)

*Primary Examiner* — Anh Mai
*Assistant Examiner* — Zachary J Snyder
(74) *Attorney, Agent, or Firm* — Cooley LLP

(57) ABSTRACT

Disclosed herein are transparent color displays with nanoparticles made with nonlinear materials and/or designed to exhibit optical resonances. These nanoparticles are embedded in or hosted on a transparent substrate, such as a flexible piece of clear plastic or acrylic. Illuminating the nanoparticles with invisible light (e.g., infrared or ultraviolet light) causes them to emit visible light. For example, a rare-earth doped nanoparticle may emit visible light when illuminated simultaneoulsy with a first infrared beam at a first wavelength $\lambda_1$ and a second infrared beam at a second wavelength $\lambda_2$. And a frequency-doubling nanoparticle may emit visible light when illuminated with a single infrared beam at the nanoparticle's resonant frequency. Selectively addressing these nanoparticles with appropiately selected pump beams yields visible light emitted from the nanoparticles hosted by the transparent substrate in a desired pattern.

27 Claims, 7 Drawing Sheets

(51) Int. Cl.
G09F 13/00 (2006.01)
G02F 1/01 (2006.01)
G02F 1/19 (2006.01)
B82Y 20/00 (2011.01)

(56) References Cited

U.S. PATENT DOCUMENTS

| | | | |
|---|---|---|---|
| 6,897,999 B1* | 5/2005 | Bass et al. | 359/326 |
| 6,986,581 B2 | 1/2006 | Sun et al. | |
| 7,090,355 B2 | 8/2006 | Liu et al. | |
| 7,136,031 B2 | 11/2006 | Lee et al. | |
| 7,182,467 B2 | 2/2007 | Liu et al. | |
| 7,213,923 B2 | 5/2007 | Liu et al. | |
| 7,452,082 B2 | 11/2008 | Sun et al. | |
| 7,537,346 B2 | 5/2009 | Liu et al. | |
| 7,587,120 B2 | 9/2009 | Koo et al. | |
| 8,123,365 B2 | 2/2012 | Quach et al. | |
| 8,187,726 B2 | 5/2012 | Sasaki et al. | |
| 8,294,993 B2 | 10/2012 | Niesten | |
| 8,525,829 B2 | 9/2013 | Smithwick et al. | |
| 8,651,678 B2 | 2/2014 | Lanman et al. | |
| 8,681,174 B2 | 3/2014 | Nam et al. | |
| 8,803,947 B2 | 8/2014 | Cho et al. | |
| 8,920,685 B2 | 12/2014 | Jang et al. | |
| 8,923,686 B2 | 12/2014 | Krishnaswamy | |
| 9,139,737 B1 | 9/2015 | Shah et al. | |
| 2005/0040562 A1 | 2/2005 | Steinmann et al. | |
| 2005/0094266 A1 | 5/2005 | Liu et al. | |
| 2005/0231652 A1 | 10/2005 | Liu et al. | |
| 2005/0231692 A1 | 10/2005 | Sun et al. | |
| 2006/0197922 A1 | 9/2006 | Liu et al. | |
| 2007/0065665 A1 | 3/2007 | Sato et al. | |
| 2008/0043301 A1 | 2/2008 | Lewis | |
| 2010/0253492 A1 | 10/2010 | Seder et al. | |
| 2010/0253594 A1 | 10/2010 | Szczerba et al. | |
| 2011/0171789 A1 | 7/2011 | Korgel et al. | |
| 2011/0235359 A1 | 9/2011 | Liu et al. | |
| 2012/0019923 A1 | 1/2012 | Niesten et al. | |
| 2012/0234460 A1 | 9/2012 | Zhang et al. | |
| 2012/0320291 A1 | 12/2012 | Yang et al. | |

FOREIGN PATENT DOCUMENTS

| | | |
|---|---|---|
| KR | 10-2009-0120171 | 11/2009 |
| KR | 10-2011-0132137 | 12/2011 |
| KR | 10-2012-0061539 | 6/2012 |
| WO | WO/2005/043232 A2 | 5/2005 |
| WO | WO 2005/043232 A2 | 5/2005 |
| WO | WO/2005/043233 A2 | 5/2005 |
| WO | WO 2005/043233 A2 | 5/2005 |
| WO | WO 2005/103814 A2 | 11/2005 |
| WO | WO/2005/103814 A2 | 11/2005 |
| WO | WO 2006/094262 A2 | 9/2006 |
| WO | WO/2006/094262 A2 | 9/2006 |
| WO | WO/2006/094262 A3 | 9/2006 |
| WO | WO 2012/016047 | 2/2012 |

OTHER PUBLICATIONS

Hao-Xin Mai; "Highly Efficient Multicolor Up-Conversion Emissions and Their Mechanisms of Monodisperse NaYF4:Yb,Er Core and Core/Shell-Structured Nanocrystals"; J. Phys. Chem. C 2007, 111, 13721-13729; ReceiVed: May 21, 2007; In Final Form: Jul. 6, 2007.*
International Search Report in related PCT Application No. PCT/US2013/078234, mailed Jun. 11, 2014, 14 pages.
Arsenault, A.C. et al., Photonic-crystal full-colour displays. *Nature Photonics*, vol. 1, Aug. 2007, pp. 468-472.
Chatterjee, U. et al., Dispersion of Functionalized Silver Nanoparticles in Polymer Matrices: Stability, Characterization, and Physical Properties. *Polymer Composites*, 2009, pp. 827-834.
Chou, J.B. et al., Design of Wide-Angle Selective Absorbers/Emitters with Dielectric Filled Metallic Photonic Crystals for Thermophotovoltaic Applications. *Optics Express*, vol. 22, No. S1, pp. A144-A154, (published Dec. 17, 2013).
Dodgson, N.A., 3D without the glasses. *Nature*, vol. 495, Mar. 21, 2013, pp. 316-317.
Fattal, D. et al., A multi-directional backlight for a wide-angle, glasses-free three-dimensional display. *Nature*, vol. 495, Mar. 21, 2013, pp. 348-351.
Geng, J., Three-dimensional display technologies. *Advances in Optics and Photonics*, vol. 5, 2013, pp. 456-535.
Hinklin, T.R. et al., Transparent, Polycrystalline Upconverting nanoceramics: Towards 3-D Displays. *Advanced Materials*, vol. 20, 2008, pp. 1270-1273.
Hong, K. et al., Full-color lens-array holographic optical element for three-dimensional optical see-through augmented reality. *Optics Letters*, vol. 39, No. 1, Jan. 1, 2014, pp. 127-130.
Hsu, C.W. et al., Observation of trapped light within the radiation continuum. *Nature*, vol. 499, Jul. 11, 2013, pp. 188-191.
Lee, J-H et al., Optimal projector configuration design for 300-Mpixel multi-projection 3D display. *Optics Express*, vol. 21, No. 22, Nov. 4, 2013, 16 pp.
Vodnik, V.V. et al., Thermal and optical properties of silver-poly(methylmethacrylate) nanocomposites prepared by in-situ radical polymerization. *European Polymer Journal*, vol. 46, 2010, pp. 137-144.
Wan, W. et al., Directional light-guide devices with continuously variable spatial frequency sub-micron grating structures for autostereoscopic display applications. *Holography, Diffractive Optics, and Applications, SPIE*, vol. 9271, 6 pp.
Zhang, S. et al., Enhancing the emission directionality of organic light-emitting diodes by using photonic microstructures. *Applied Physics Letters*, vol. 103, 2013, 4 pp.
"SplitView" technology for the E Class: One screen for two programs, Separate Info for driver and front-seat passenger, Bosch Press Release, May 2013, 2 pp.
Althues, H. et al., Functional inorganic nanofillers for transparent polymers. *Chem. Soc. Rev.*, vol. 36, 2007, pp. 1454-1465.
Colombo, A. et al., Nanoparticle-doped large area PMMA plates with controlled optical diffusion. *J. Mater. Chem. C.*, vol. 1, Mar. 8, 2013, pp. 2927-2934.
Colombo, A. et al., Nanoparticle-doped large area PMMA plates with controlled optical diffusion. Electronic Supplementary Material (ESI) for *J. Mater. Chem. C.*, Mar. 8, 2013, pp. 1-5.
Meinardi, F. et al., Large-area luminescent solar concentrators based on 'Stokes-shift-engineered' nanocrystals in a mass-polymerized PMMA matrix. *Nature Photonics*, vol. 8, Apr. 13, 2014, pp. 392-399.
Simonutti, R. et al., Nanoparticles confer tailored optical properties on plastics. *SPIE*, Newsroom, Aug. 18, 2014, pp. 1-3.

* cited by examiner

METHODS AND APPARATUS FOR TRANSPARENT DISPLAY USING UP-CONVERTING NANOPARTICLES

CROSS-REFERENCE TO RELATED APPLICATIONS

This application claims the benefit, under 35 U.S.C. §119(e), of U.S. Application No. 61/748,228, filed on Jan. 2, 2013, and entitled "Methods and Apparatus for Transparent Display Using Scattering Particles," which application is hereby incorporated by reference in its entirety.

This application also claims the benefit, under 35 U.S.C. §119(e), of U.S. Application No. 61/748,259, filed on Jan. 2, 2013, and entitled "Methods and Apparatus for Transparent Display Using Up-Converting Particles," which application is hereby incorporated by reference in its entirety.

This application also claims the benefit, under 35 U.S.C. §119(e), of U.S. Application No. 61/866,468, filed on Aug. 15, 2013, and entitled "Methods and Apparatus for Transparent Display Using Up-Converting Particles," which application is hereby incorporated by reference in its entirety.

This application is also related to U.S. application Ser. No. 14/067,471, filed on Oct. 30, 2013, and entitled "Methods and Apparatus for Transparent Display Using Scattering Particles," which application is hereby incorporated by reference in its entirety.

GOVERNMENT SUPPORT

This invention was made with government support under Grant No. DMR0819762 awarded by the National Science Foundation and under Contract No. W911NF-07-D-0004 awarded by the Army Research Office and under Grant Nos. DE-SC0001299 and DE-FG02-09ER46577 awarded by the Department of Energy. The government has certain rights in the invention.

BACKGROUND

Transparent displays are long sought-after by scientists and engineers. Two-dimensional (2D) transparent displays can create images that appear to float in the air, in contrast to traditional displays where images appear on a visible screen. Aside from creating special visual impressions, such displays can have a wide variety of applications. A glass window can be turned into the screen of a home theater. Eyeglasses can become a mini computer screen. The windshield of a vehicle can show information, such as a map, without blocking the driver's view. A store display window can show not only products but also information about the products.

Three-dimensional (3D) transparent displays can enable another wide range of applications. Multi-dimensional scientific data can be visualized in 3D. Doctors can perform virtual surgery with greater precision. Engineers can create computer-aided design models in an actual 3D workspace. Oil and gas explorers can see exactly where to aim the drills. And audience members no longer have to wear special eyewear when watching a 3D movie in the theater.

A number of transparent display technologies exist, but none have gained a widespread usage. Eliminating the backlight of a liquid crystal display (LCD) increases its transparency, but only up to a transmittance of about 15%. An organic light-emitting diode (OLED) can also be made transparent, but OLED production remains costly and OLED transmittance is also limited (typically less than 40%). Electroluminescent displays have also been made transparent, but have so far been limited to single colors. Recently, fluorescent films have been combined with ultraviolet (UV) lights to make multi-colored displays that are transparent; however, intense UV sources are required due to the small emission cross sections of the fluorescent particles.

There has also been progress in 3D transparent displays, but such technologies have remained either in the lab or in specialized facilities. Technologies based on revolving 2D displays suffer from image flickering. Stacking several 2D displays yields a quasi-3D display with a limited viewing angle that cannot provide true 3D image depth. At least one prototype of a volumetric 3D laser display has also been demonstrated, but it was a miniature device, and its production is very difficult to scale. To date, none of these technologies has yielded a 3D display that is practical enough for consumer use.

SUMMARY

In view of the foregoing, various inventive embodiments disclosed herein relate generally to achieving clear transparent displays with potentially low production costs. These inventive embodiments may represent an enabling technology to bring transparent displays into the consumer market.

Exemplary embodiments include a display with a transparent substrate, at least one nanoparticle disposed on the transparent substrate, a first light source, and a second light source and a corresponding method of operating such a display. The first and second light sources are in optical communication with the nanoparticle. The first light source generates a first infrared beam at a first wavelength $\lambda_1$, and the second light source generates a second infrared beam at a second wavelength $\lambda_2$. The two light sources illuminate the nanoparticle with the first and second infrared beams so as to cause the at least one nanoparticle to emit visible light at a visible wavelength $\lambda_v = (\lambda_1 \lambda_2)/(\lambda_1 + \lambda_2)$ in the direction of a viewer.

Other exemplary embodiments include methods of making displays with one or more nanoparticles that emit visible light when illuminated by infrared light. In one method, a nanoparticle is deposited on a substrate that has a transmittance of about 90% to about 100% from about 390 nm to about 760 nm. A first infrared beam is aligned to illuminate the nanoparticle in a first direction that is substantially orthogonal to an optical axis of the substrate. A second infrared beam is also aligned to illuminate the nanoparticle in a second direction that is also substantially orthogonal to the optical axis of the substrate.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1:
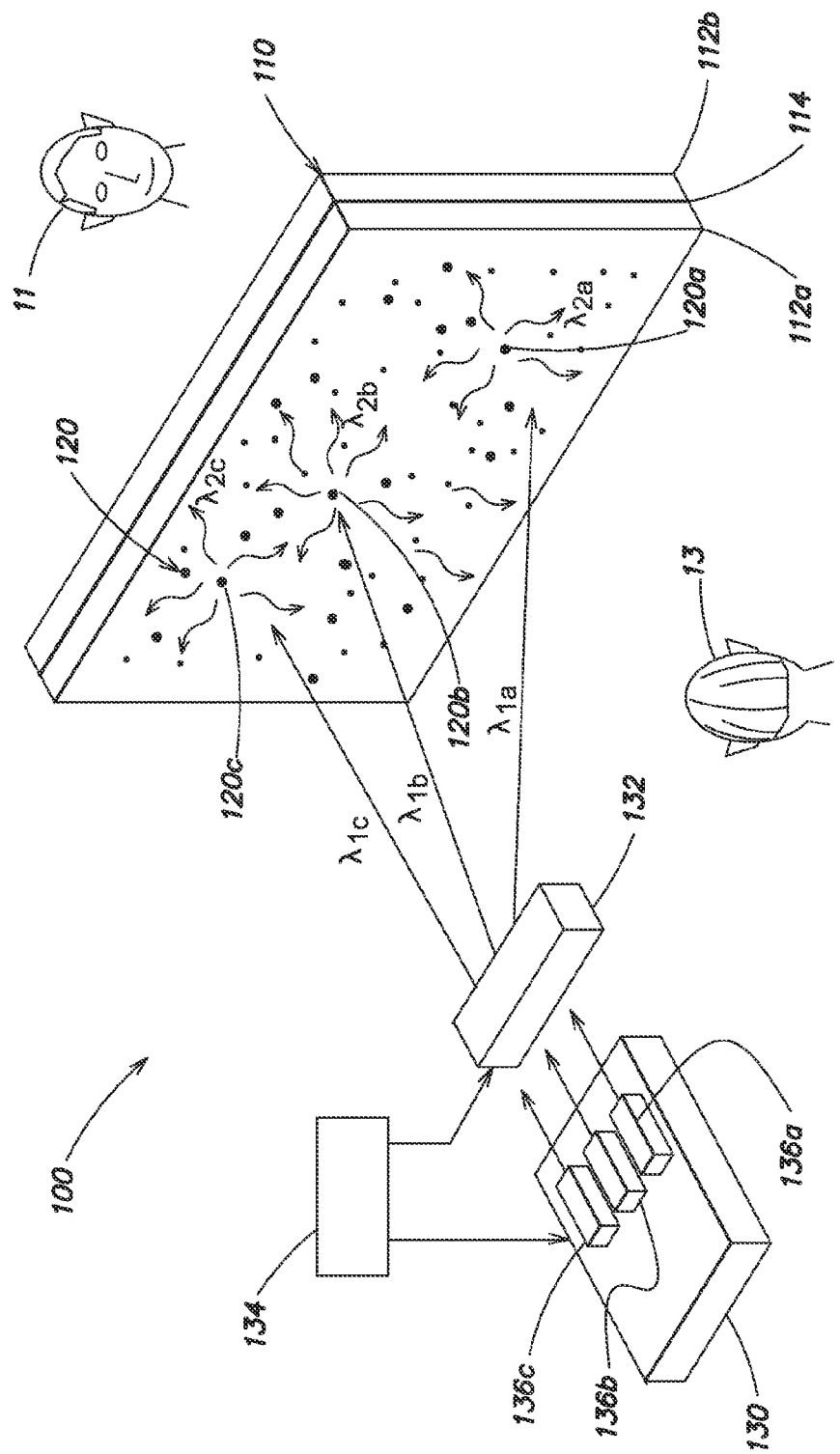
FIG. 1 shows a back-lit transparent display with nanoparticles that upconvert incident infrared light via a nonlinear frequency-doubling interaction.

In a traditional display system based on light projection—for example, a projector used for presentations and in movie theaters—the screen is opaque to maximize scattering of the projected light so that viewers can see images on the screen. In such cases, the screen scatters the light efficiently to increase the contrast ratio and to reduce the amount of power required to produce a visible image. But because the display system relies on scattering to produce the image, the screen cannot be transparent.

Existing transparent two-dimensional (2D) and three-dimensional (3D) laser display technologies work around this problem by using ultraviolet (UV) or infrared (IR) light to illuminate a screen that is transparent in the visible region of the electromagnetic spectrum but not in the UV or IR regions of the electromagnetic spectrum. Light from the UV or IR light source is converted to visible light by fluorescent or nonlinear materials on the screen; this visible light appears to the viewer as an image. Such a display may have a transparent screen, but typically also requires high-power laser illumination because the fluorescent or nonlinear materials operate with relatively low frequency conversion efficiency.

As explained herein, however, it is possible to create a passive screen that is both substantially transparent at visible wavelengths and uses relatively efficient nonlinear upconversion of IR or UV radiation to create a visible image. The passive screen includes a substantially transparent substrate that hosts nanoparticles, which emit visible light in response to illumination at particular IR or UV wavelengths and/or particular combinations of IR or UV wavelengths. These nanoparticles are small—their diameters may be anywhere from about 10 nm to about 1.0 µm—and dispersed in an areal or volumetric concentration low enough so as to absorb or scatter only a small percentage of the incident visible light. (In some cases, the nanoparticles may be engineered or selected to have negligible scattering and/or absorption cross sections at wavelengths of about 450 nm to about 700 nm.) Because the transparent substrate and the nanoparticles absorb or scatter hardly any incident visible light, the screen appears transparent at visible wavelengths.

Depending on the embodiment, the optically resonant nanoparticles can produce visible light via an up-conversion process or a down-conversion process. For example, illuminating a nanoparticle with single-beam IR illumination causes the nanoparticle to convert the IR illumination to visible light through single-frequency up-conversion, two-photon fluorescence, or harmonic generation. In harmonic generation, the nanoparticle may include a resonant cavity and/or a $\chi^{(2)}$ or $\chi^{(3)}$ nonlinear material to achieve nearly 100% second-harmonic or third-harmonic conversion efficiency. Alternatively, the nanoparticle may down-convert a single UV beam to visible light, e.g., through a fluorescence process. Similarly, illuminating a nanoparticle at two different IR frequencies may yield visible light via two-frequency upconversion. Fano resonances and/or resonant nanoparticles can be used to improve the conversion efficiency, therefore significantly lowering the power requirement of the IR or UV light source used to stimulate the nonlinear generation of visible light.

The nanoparticles can be coated onto or embedded in a transparent substrate or sandwiched between a pair of transparent substrates to form a transparent screen. If the nanoparticles' conversion efficiency at the specified wavelength(s) is high enough, illuminating the transparent screen with a relatively low-power beam from a laser, light-emitting diode, or other spectrally coherent source at the specified invisible wavelength(s) produces an image visible to an observer in front of or behind the screen. The screen can also be lit from the side (edge lighting) with IR or UV beams at different wavelengths to produce a visible image.

Depending on the nanoparticles' emission wavelengths and the light source(s), the transparent display may be monochromatic or multi-color. For instance, if the nanoparticles emit strongly only at wavelengths at or near about 450 nm, then the display will appear blue. Similarly, a transparent display with nanoparticles that emit strongly at multiple wavelengths (e.g., 450 nm and 650 nm) can be used to show multi-color images. And a transparent display with nanoparticles that emit strongly at three or more specified wavelengths (e.g., 450 nm, 550 nm, and 650 nm) can be used as a full-color display.

A full-color transparent display may be based on an additive color scheme in which combining appropriately weighted amounts of red, green, and blue light yields the desired color. For example, adding red and blue yields magenta, adding blue and green yields cyan, and adding green and red yields yellow. Adding colors on a transparent screen that hosts red-, green-, and blue-emitting particles (or another suitable set of emitting particles) is simply a matter of illuminating a single spot on the screen with appropriately selected IR or UV beams with appropriately weighted intensities. If the beams' intensities are modulated as the beams are scanned across the screen at rates faster than the eye's integration period, the resulting emission(s) yield what appears to an observer as a full-color image on the screen. Changing the intensity modulation and/or scan pattern produces animated images.

Because the nanoparticles do not absorb or scatter significantly within the visible spectrum, the transparent display may appear transparent under normal lighting conditions if the substrates are relatively transparent as well. In fact, an exemplary transparent display can exhibit a transmittance in the visible portion of the electromagnetic spectrum of 90% or higher (e.g., a transmittance of about 90-100% wavelengths from about 390-760 nm), while converting the incident laser light at the IR or UV pump wavelength(s) into visible radiation. (Conversion percentages of about 1% to almost 100% are also possible, depending on the nanoparticles' characteristics.) High conversion efficiency makes it possible to illuminate the screen with a relatively low-intensity beams (e.g., beams with an intensity of about 1 mW or higher), which in turn makes it possible to operate the display's light source at a relatively low level of power consumption.

Exemplary transparent displays can be used for displaying moving images (e.g., video data), static images, etc. They may be suitable for use in electronics; handheld devices; heads-up displays; eyeglass/spectacle displays (e.g., Google Glass); contact lens displays; goggle-based displays; large-area displays; and so on. The usable display size depends on the substrate size and the scanning/illumination range of the light source(s) (for back-lit and front-lit displays), and the refresh rate depends on the scanning and/or modulation rates of the light source(s). Depending on the exact implementation, a transparent display can be used for showing movies, television programs, video games, computer displays, billboards, outdoor and indoor advertising displays, and so on.

If desired, a transparent display can be doped or used to host particles that emit IR or UV light. Illuminating these IR- or UV-emitting particles produces IR or UV images that can be detected with appropriately configured cameras.

Frequency-Doubling Transparent Displays with Front or Back Illumination

FIG. 1 is a diagram of a nonlinear transparent display 100 suitable for displaying monochromatic and/or full-color images using illumination from either the front or the rear. The display 100 includes a passive screen 110 made of a transparent substrates 112a and 112b sandwiched about a layer 114 of upconverting (or downconverting) nanoparticles 120. These nanoparticles 120 exhibit low absorption and scattering at visible wavelengths, so the screen 110 appears substantially transparent under ambient illumination.

Under infrared illumination from a spectrally coherent light source (e.g., light source 130) at a particular IR or UV wavelength, however, the screen 110 emits visible light in all directions. Thus, one can efficiently project color images at the emission wavelength(s) by illuminating this seemingly transparent screen 110 with appropriately selected IR or UV illumination. The image on this screen 110 appears through a nonlinear up- or down-conversion process, so the viewing angle is relatively unlimited. Furthermore, the up- or down-conversion can be relatively efficient, so the light source 130 can be a low-power source, such as a personal-use laser projector.

The screen 110 is formed of a layer 114 of upconverting nanoparticles 120 sandwiched between a pair of substantially transparent (e.g., 90%, 95%, or 99% transparent) substrates 112a and 112b. The substrates 112a and 112b may be formed of any suitable material, including but not limited to glass, plastic, acrylic, and polymers. The substrates can be rigid or flexible; for instance, they may be as rigid as plate glass, e.g., when used in a window display, or as flexible as a sheet of plastic, e.g., when used as a flexible display. For instance, the substrates 112a and 112b can be thin sheets of plastics that are flexible enough to be rolled into a cylinder with a radius of less than one inch. Similarly, the substrates can be thick or thin, e.g., 0.1 mm, 0.25 mm, 0.5 mm, 0.75 mm, 1.0 mm, 2.5 mm, or thicker, depending on the application and the nanoparticle concentration. If desired, the substrates 112a and 112b may be tinted, textured, or otherwise patterned to achieve a particular effect, such as an area of opacity or diffuse transmission.

The layer 114 of upconverting nanoparticles 120 sandwiched between the substrates 112a and 112b may be formed by coating, printing, painting, spraying, or otherwise depositing a nanoparticle solution onto one or both of the substrates 112a and 112b as described in greater detail below. In some cases, the substrates 112a and 112b may be pressed together to remove air bubbles and to ensure that the nanoparticle layer's thickness and surface are relatively uniform. The nanoparticle layer 114 may be as thin as the diameter of the largest nanoparticle 120; it can also be much thicker, e.g., several times the largest nanoparticle's diameter, depending on whether or not the nanoparticles 120 clump together and whether the nanoparticle layer 114 includes a matrix (e.g., a polymer matrix) that separates the substrates 112a and 112b. Alternatively, or in addition, spacers (not shown) may separate the substrates 112a and 112b to form a cavity that holds the nanoparticles 120.

The upconverting nanoparticles 120 in the nanoparticle layer 114 may be distributed in a periodic, aperiodic, or random fashion when viewed along the display's optical axis (i.e., the axis normal to the surfaces of the substrates 112a and 112b). In some cases, the nanoparticles 120 are distributed uniformly (if randomly) within the nanoparticle layer 114 with an areal density of about $10^8$ cm$^{-2}$ to about $10^{11}$ cm$^{-2}$ (e.g., $5 \times 10^8$ cm$^{-2}$, $10^9$ cm$^{-2}$, $5 \times 10^9$ cm$^{-2}$, $10^{10}$ cm$^{-2}$, or $5 \times 10^{10}$ cm$^{-2}$). The volumetric density may be about $10^{10}$ cm$^{-2}$ to about $10^{13}$ cm$^2$ (e.g., $5 \times 10^{10}$ cm$^{-2}$, $10^{11}$ cm$^{-2}$, $5 \times 10^{11}$ cm$^{-2}$, $10^{12}$ cm$^{-2}$, or $5 \times 10^{12}$ cm$^{-2}$). Other areal and volumetric densities may also be possible. In other cases, the nanoparticles 120 may be distributed more or less densely in certain areas, e.g., to form opaque areas or transparent areas on the screen 110.

Given the cross-section(s) and the concentration of the nanoparticles, the thickness of the screen 110 should be chosen to balance the extinction at visible wavelengths, which is the product of the nanoparticle scattering cross section(s), nanoparticle density, and screen thickness, at visible wavelengths, with the desired conversion efficiency at the pump wavelength. Generally, the screen 110 should be thick enough that a significant fraction of the light at the pump wavelength is converted to visible light, but thin enough that a negligible fraction of incident visible light is absorbed or scattered (e.g., the screen may about 0.1 cm thick to about 1.0 cm thick).

The nanoparticles 120 may be of any suitable shape, including but not limited to spheres, ellipsoids, oblate spheroids, and prolate spheroids. They may be solid particles made of a single nonlinear material (e.g., a rare earth material, such as praseodymium, erbium, thulium, europium, cerium, or terbium), hollow particles with cavities designed to resonate at visible frequencies in response to IR or UV illumination, or solid particles coated with outer layers of nonlinear material. Other suitable nanoparticles may have a U-shape or horseshoe shape suitable for inducing a current loop when irradiated by incident IR or UV radiation.

The nanoparticles 120 may include dielectric materials, including silica, silicon, and titanium dioxide; metals, including silver, gold, and copper; rare-earth metals, including erbium, thulium, europium, cerium, and terbium; and combinations of dielectric materials, rare-earth metals, and other metals. Their outer diameters may range from about 5 nm to about 250 nm (e.g., 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, or 95 nm, 100 nm, 125 nm, 150 nm, 175 nm, 200 nm, or 225 nm). The nanoparticles' exact shape, size, and composition may depend on the desired frequency conversion properties.

As explained in greater detail below, the nanoparticles 120 emit visible light at one or more specified wavelengths depending on their composition and size. If desired, the nanoparticles 120 may include different types of nanoparticles, each of which emits light at only one wavelength—for example, at about 460 nm, about 530 nm, and about 650 nm. For example, the nanoparticles 120 may include red-emitting nanoparticles 120a formed of Praseodymium ($Pr^{3+}$) ions, green-emitting nanoparticles 120b formed of Erbium ($Er^{3+}$) ions, and blue-emitting nanoparticles 120c formed of Thulium ($Tm^{3+}$) ions. These red-emitting nanoparticles, green-emitting nanoparticles, and blue-emitting nanoparticles may be mixed in equal proportions, in proportions weighted based on the human eye's sensitivity to different colors, or in any other desired proportion. Alternatively, or in addition, some or all of the nanoparticles 120 may be configured to emit light at multiple wavelengths (e.g., at wavelengths corresponding to red, green, and blue), for instance, by forming the nanoparticles out of different types of rare-earth materials (e.g., praseodymium, erbium, and thulium). Other mixtures of nanoparticles 120 are also possible (e.g., monochromatic, two-color, etc.).

In this embodiment, a spectrally coherent light source 130 illuminates the nanoparticles 120 at an IR wavelength $\lambda_1$ that is about equal to twice the nanoparticles' visible emission wavelength $\lambda_2$ (i.e., $\lambda_1=2\lambda_2$). Depending on the implementation, the light source 130 may include one or more lasers, light-emitting diodes (LEDs), or other spectrally coherent sources configured to generate light at wavelengths absorbed by one or more of the nanoparticles 120. For instance, the light source 130 may include a first laser diode 136a that emits a first beam at a first infrared wavelength $\lambda_{1a}$, a second laser diode 136b that emits a second beam at a second infrared wavelength $\lambda_{1b}$, and a third laser diode 136c that emits a third beam at a third infrared wavelength $\lambda_{1c}$ (collectively, laser diodes 136). The IR wavelengths $\lambda_{1a}$, $\lambda_{1b}$, and $\lambda_{1c}$, are selected to stimulate emission of visible light at wavelengths of $\lambda_{2a}$, $\lambda_{2b}$, and $\lambda_{2c}$, respectively, by one or more corresponding nanoparticles 120.

Alternatively, the light source 130 may include a broadband light source (e.g., an ultra high performance (UHP) lamp or household projector). One or more dichroic filters or bandpass filters select the desired IR wavelength(s). Because a broadband light source is not monochromatic, its conversion efficiency may not be as high as that of a laser or other monochromatic source. However, a broadband light source may provide higher power than a laser diode at a relatively low cost.

To produce an image on the screen 110, a beam-steering element 132, which may include a galvo-scanning mirror or acousto-optic deflector, directs the IR beams from the laser diodes 136 to different areas on the screen 110. In some cases, the beam-steering element 132 may include a microelectromechanical systems (MEMS) device integrated into the light source 130 (e.g., as in the MicroVision SHOWW+ Laser Pico Projector). Optional beam-combining optics and beam-shaping optics (not shown), such as lenses, pinholes, prisms, and diffractive elements, may combine and/or collimate or loosely focus the IR beams to prevent undesired divergence. Additional beam-shaping optics (not shown) may focus the steered beams to corresponding spots in the plane of the nanoparticle layer 114.

For example, the beam-steering element 132 may steer or scan the IR beams along a raster pattern (or any other suitable scan pattern) while a processor 134 modulates the IR beams' respective intensities to produce the desired image(s) on the screen. The controller 134, which may include a processor, memory, communications interface, user interface, and any other suitable components, may control the beam-steering element 132 and the light source 130 in response to user input, input from a video or image data source, or both to form a particular image or series of images on the screen 110.

In operation, the IR beam(s) may form a spot on the screen 110 that illuminates several nanoparticles 120, including at least one red-emitting nanoparticle 120a and at least one blue-emitting nanoparticle 120c. The red-emitting nanoparticle 120a emits red light, and the blue-emitting nanoparticle 120c emits blue light. Observers 11 and 13 looking at the screen 110 may perceive the emitted red and blue light as a magenta spot on the screen 110.

Frequency-Summing Transparent Displays with Front or Back Illumination

Figure 2:
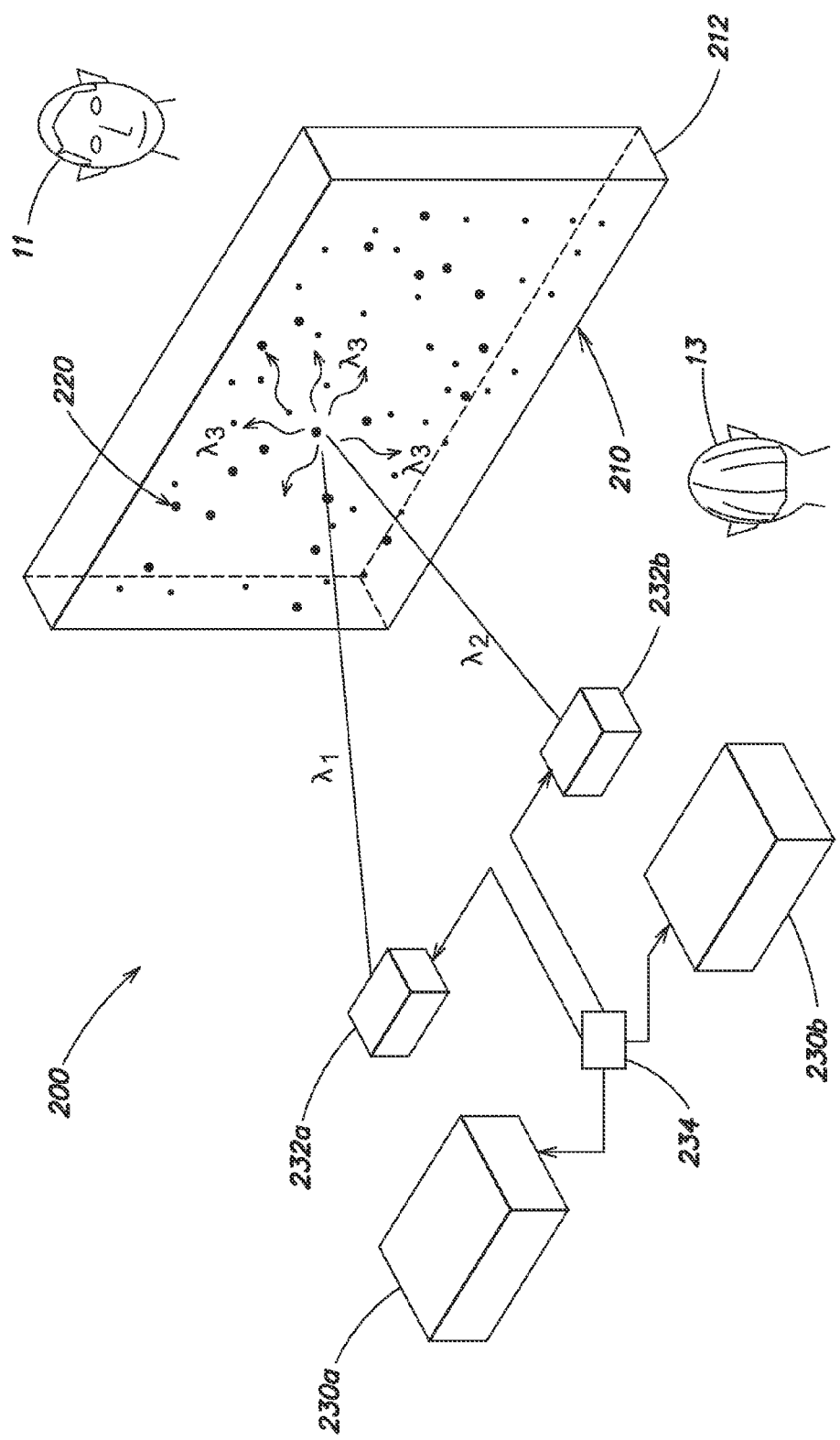
FIG. 2 shows a back-lit transparent display with nanoparticles that upconvert incident infrared light via a nonlinear sum-frequency interaction.

FIG. 2 illustrates a frequency-summing transparent display 200 that uses upconverting nanoparticles 220 to produce images visible to observers 11 and 13 in front of and behind the display 200, respectively. Like the display 100 shown in FIG. 1, the transparent display 200 includes a transparent screen 210 formed of upconverting nanoparticles 220 in a transparent substrate 212. In this case, however, the nanoparticles 220 emit visible light at a wavelength $\lambda_3$ in response to illumination at infrared wavelengths $\lambda_1$ and $\lambda_2$ from a pair of spectrally coherent light sources 230a and 230b (collectively, light sources 230), such as IR lasers. The wavelengths are typically selected such that $\lambda_3=(\lambda_1\lambda_2)/(\lambda_1+\lambda_2)$.

In operation, a processor 234 coupled to the light sources 230 may modulate the amplitudes of the IR beams emitted by the light sources 230. The processor 234 is also coupled to beam-steering elements 232a and 232b (collectively, beam-steering elements 232), which scan or steer the modulated IR beams in azimuth and/or elevation according to commands from the processor 234. When the IR beams illuminate the same area on the transparent screen, the nanoparticles 220 in the illuminated area absorb the incident IR light and emit visible light.

In other embodiments, the processor 234 may not modulate the amplitudes of the beams emitted by the light sources 230. Instead, the processor 234 may simply steer one beam away from the other beam to stop emission of visible light at a spot illuminated by both beams. Alternatively, one light source 230a may illuminate the entire screen 210 (or a selected portion of the screen 210) with spatially and temporally uniform IR or UV radiation, and the processor 234 may modulate and steer the beam emitted by the other light source 230b to produce visible radiation from one or more selected locations on the screen 210. Or the processor may modulate the amplitude of a beam that illuminates the entire screen 210 as it steers a spot formed by an unmodulated beam on the screen 210 to produce a visible image.

Multi-color and full-color embodiments of the display may include several spectrally coherent lights sources to pump nanoparticles that absorb IR or UV light at different wavelengths and emit visible light at different wavelengths. For instance, the screen may host red-emitting nanoparticles, green-emitting nanoparticles, and blue-emitting nanoparticles. The red-emitting nanoparticles may absorb light at IR or UV pump wavelengths $\lambda_{1a}$ and $\lambda_{2a}$ and emit light at a wavelength $\lambda_{3a}$ between about 580 nm and about 760 nm. Similarly, the green-emitting nanoparticles may absorb light at IR or UV pump wavelengths $\lambda_{1b}$ and $\lambda_{2b}$ and emit light at a wavelength $\lambda_{3b}$ between about 490 nm and about 580 nm. And the blue-emitting nanoparticles may absorb light at IR or UV pump wavelengths $\lambda_{1c}$ and $\lambda_{2c}$ and emit light at a wavelength $\lambda_{3c}$ between about 390 nm and about 490 nm. In some cases, each pump wavelength may be different from every other pump wavelength, and the display may include six different light sources; in other cases, some pump wavelengths may be coincident, allowing the display to operate with six or fewer light sources.

Edge-Lit, Frequency-Summing Transparent Displays

Figure 3:
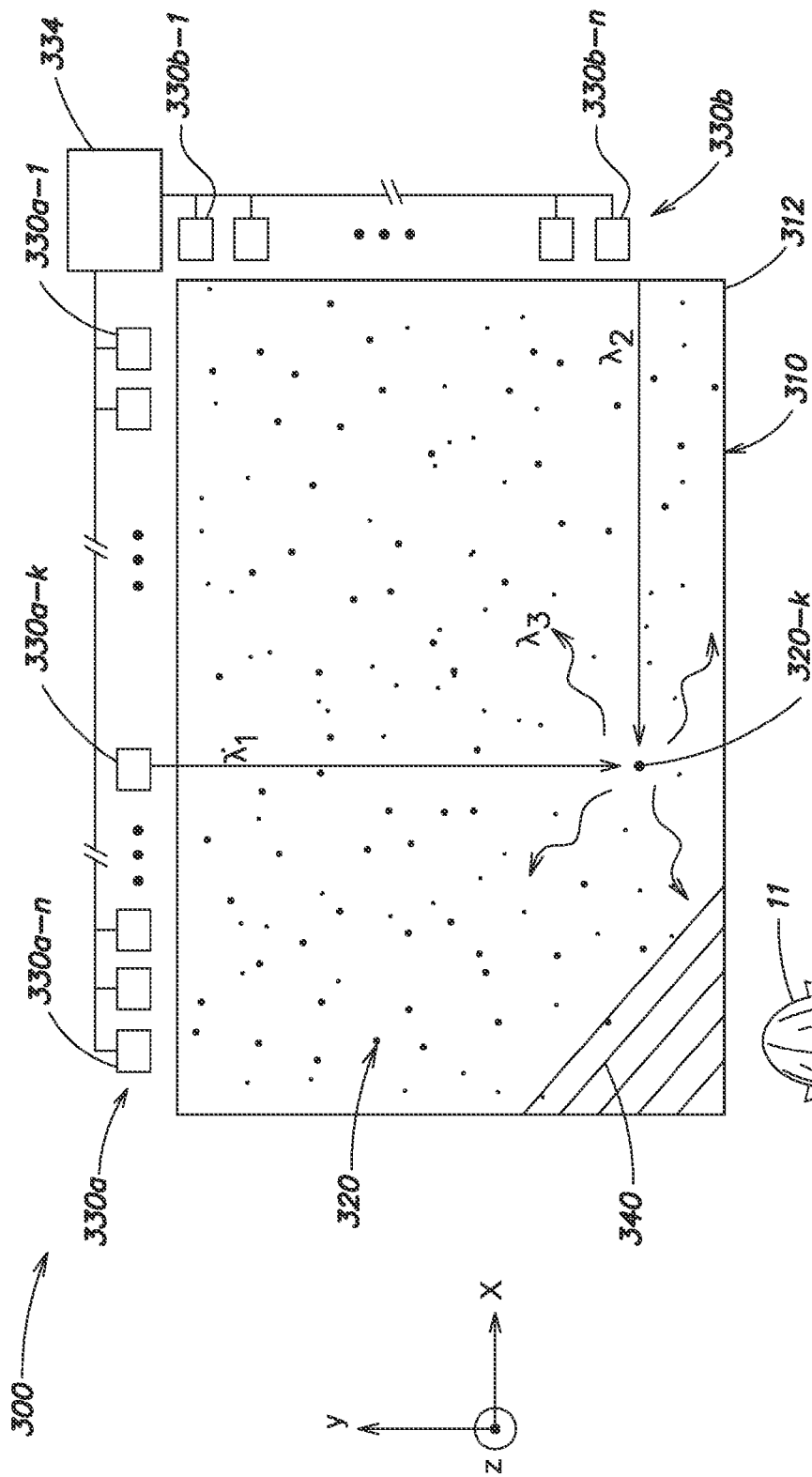
FIG. 3 shows an edge-lit transparent display with nanoparticles that upconvert incident infrared light via a nonlinear sum-frequency interaction.

FIG. 3 shows an edge-lit transparent display 300 that uses frequency-summing nanoparticles 320 to produce visible light. Like the displays shown in FIGS. 1 and 2, the display 300 shown in FIG. 3 includes a transparent screen 310 formed of a transparent substrate 312 that hosts upconverting nanoparticles. When illuminated at appropriately selected IR wavelengths, the nanoparticles 320 produce visible light via a sum-frequency process. This visible light radiates in all directions, including towards an observer 11 looking along the transparent display's optical axis. An optional reflective layer 340 on the back of the transparent screen 310 reflects the emitted light towards the observer 11 as well.

In this example, however, the display 300 includes a first group of light sources 330a-1 through 330a-n (collectively, light sources 330a) and a second group of light sources 330b-1 through 330b-n (collectively, light sources 330b) disposed along adjacent edges of the transparent screen 310. (The light sources 330a and 330b may also include or be coupled to beam collimating optics, etc., (not shown) that collimate or loosely focus the IR beams launched into the transparent screen 310.) As shown in FIG. 3, the light sources 330a are oriented to emit light at an IR wavelength $\lambda_1$ in the y direction as indicated by the axes shown at left in FIG. 3 (i.e., along "columns" in the plane of the transparent screen 310). And the light sources 330b are oriented to emit light at an IR wavelength $\lambda_2$ in the x direction (i.e., along "rows" in the plane of the transparent screen 310). In other words, the light sources 330a and 330b are oriented to emit light that propagates in a plane substantially orthogonal to the transparent display's optical axis (the z axis shown at left in FIG. 3).

To produce visible light, a processor or controller 334 coupled to the light sources 330a and 330b activates at least one "column" light source 330a (e.g., light source 330a-k) and at least one "row" light source 330b (e.g., light source 330b-n). The activated column light source 330a-k and row light source 330b-n emit collimated or loosely focused beams at IR wavelengths of $\lambda_1$ and $\lambda_2$, respectively, that illuminate one or more ions 320-k at the beams' intersection point. The beam at IR wavelength $\lambda_1$ excites the ions 320-k to a metastable state, and the other beam at IR wavelength $\lambda_2$ excites the ions 320-k from the metastable state to a higher excited state. The excited ions 320-k decay back to the ground state with spontaneous emission that creates photons at a visible wavelength $\lambda_3$. The processor 334 can form an image or sequence of images (e.g., a video) by selectively activating different column light sources 330a and row light sources 330b in a manner similar to the row/column addressing schemes used in conventional liquid-crystal displays.

Alternatively, the display 300 may include a first light source that emits a first beam of light at IR wavelength $\lambda_1$ and a second light source that emits a second beam of light at an IR wavelength $\lambda_2$. Beam deflectors, such as MEMS mirrors, steer or scan the first and second beams along "rows" and "columns" through the transparent screen 310 to stimulate emission of visible light from nanoparticles (ions) 320 in the volumes where the beams overlap. A complete image can be obtained by scanning the beams along the transparent display's edges to raster scan their intersection point along the transparent display's face (e.g., by scanning one beam quickly and the other beam slowly).

If the light sources 330 (and optional beam deflectors) are integrated with the screen 310 (e.g., on the same flexible substrate), then the entire display 300 can be formed into a compact object suitable for use in mobile devices, including cell phones, tablets, laptop computers, and personal digital assistants. In some cases, the entire display 300 may form a thin, hermetically sealed or encapsulated flexible package that can be flexed, bent, twisted, or rolled.

If desired, the transparent screen 310 can host different types of nanoparticles, each of which generates light at a different wavelength. For instance, the substrate material may be doped with active rare-earth ions (nanoparticles), including Praseodymium ($Pr^{3+}$) ions to emit red light, Erbium ($Er^{3+}$) ions to emit green light, and Thulium ($Tm^{3+}$) ions to emit blue light. These ions can be distributed periodically, randomly, or uniformly in a single layer or in separate layers (e.g., one for each color). And as described above, the emission wavelengths of the light sources 330a and 330b can be selected based on the ions (nanoparticles). For instance, the column light sources 330a and row light sources 330b may emit light at up to six different IR wavelengths so as to stimulate emission from the Praseodymium, Erbium, and Thulium ions.

Three-Dimensional Transparent Displays

Figure 4:
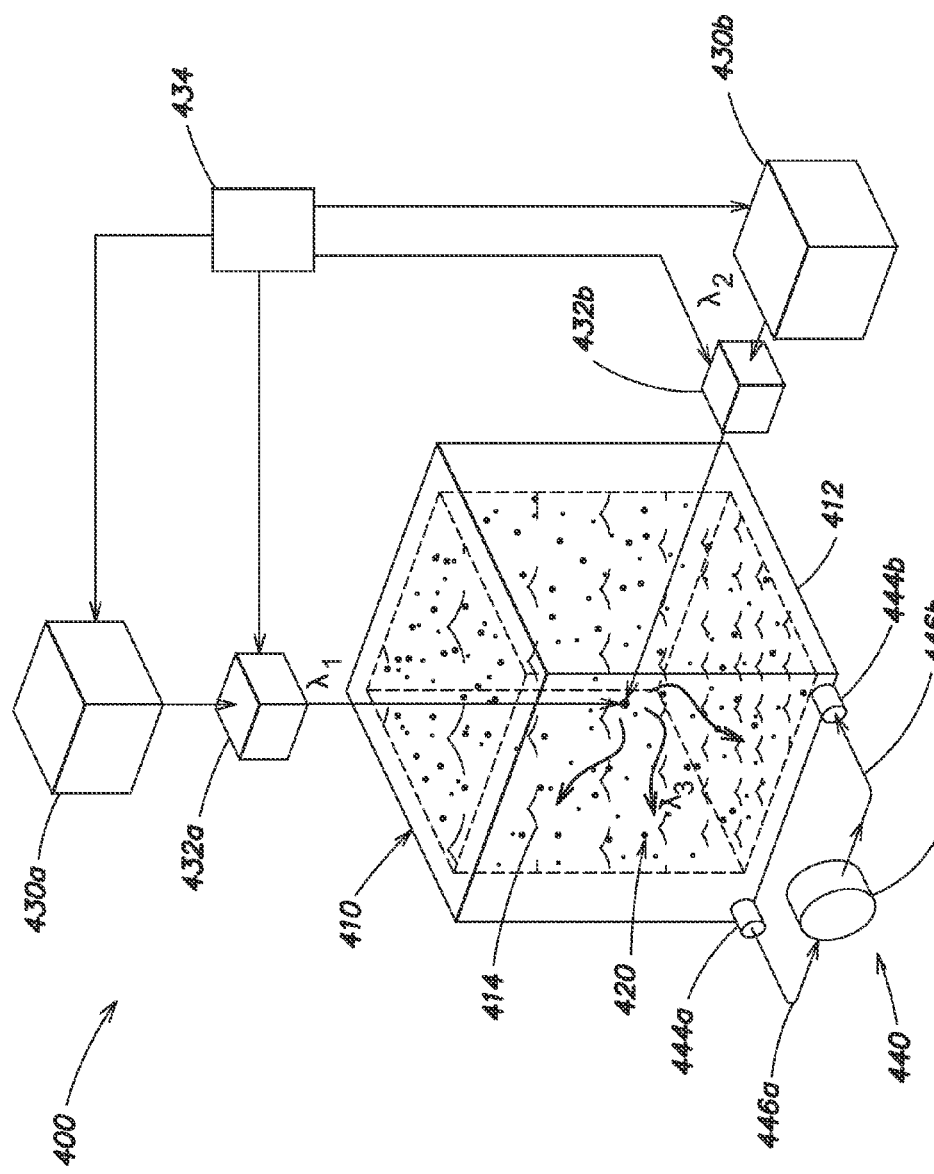
FIG. 4 shows a three-dimensional transparent display made with upconverting nanoparticles circulated within a cavity using a circulation system.

FIG. 4 shows a three-dimensional (3D) laser display 400 that uses two-frequency up-conversion in rare-earth nanoparticles 420 to produce visible light from IR pump beams. The nanoparticles 420 replace the heavy and expensive bulk ZBLAN glass used in other 3D displays, and optical resonances of the nanoparticles can enhance the up-conversion efficiency, lowering the optical power requirements. Like the displays described above, a processor 434 actuates a pair of light sources 430a and 430b (collectively, light sources 430) and a corresponding pair of beam-steering elements 432a and 432b (collectively, beam-steering elements 432) to illuminate the nanoparticles 420, which are hosted by a transparent substrate 412. By appropriately amplitude modulating and scanning the beams emitted by the light sources 430, the processor 434 can project static or dynamic images within the volume of a transparent screen 410.

In this case, the nanoparticles 420 are suspended in a fluid 414, such as a transparent liquid or gas (e.g., air), within an enclosed volume (a cavity) defined by the transparent substrate 412. A circulation system 440 in fluid communication with the enclosed volume circulates the nanoparticles 420 to promote even spatial distribution of the nanoparticles 420. Circulation may also prevent the pump beams from saturating the nanoparticles by causing nanoparticles 420 to move in and out of persistently or constantly illuminated portions of the transparent screen 410.

As shown in FIG. 4, this circulation system 440 may include a pump 442 coupled to the cavity inside the transparent screen 410 via a first pipe 446a coupled to an outlet valve 444a and a second pipe 446b coupled to an inlet valve 444b. Fluid 414 (including the nanoparticles 420) flows out of the cavity via the outlet valve 444a, through the first pipe 446a, to the pump 442, which propels it through the second pipe 446b back into the cavity via the inlet valve 444b. If desired, the pump 442 and the pipes 446a, 446b can be decoupled from the transparent screen 410 by shutting the valves 444a, 444b. Other pumping or circulation schemes are also possible. For nanoparticles suspended in gas, for example, the gas may be circulated using a fan, blower, or other device suitable for propelling or suctioning fluid.

Display Resolution and Alternative Architectures

Together, the size of the illuminated spot and the nanoparticle density set the pixel size, or resolution, of a transparent display (e.g., the displays shown in FIGS. 1-4). As long as the spot is large enough to encompass at least one nanoparticle, it should produce emitted light visible to an observer. Unlike conventional displays, however, the pixel size of a front- or back-lit transparent display can be adjusted on the fly by simply increasing or decreasing the focused spot size, e.g., using a zoom lens. In addition, the spot size can be very small, e.g., on the order of the illumination wavelength, for resolution much finer than the finest resolution achievable with conventional pixelated displays. (In some cases, however, the beam-steering element's scanning capability may limit the number of resolvable spots on the display if the number of distinct scan angles/positions is smaller than the display's area divided by the spot size.)

Those of skill in the art will readily understand that front- and back-lit transparent displays can use other architectures instead of those shown in FIGS. 1, 2, and 4. For instance, the light sources may include LEDs that emit IR or UV light at appropriately selected wavelengths instead of laser diodes. The IR/UV beams may also be steered independently, e.g., by using a separate beam-steering element for each light source. The display can also use a single beam-steering element to steer pulsed monochromatic beams in a repetitive sequence, e.g., a first IR/UV beam, then a second IR/UV beam, and then a third IR/UV beam. The beam-shaping optics can also be selected depending on the desired spot size (display resolution), working distance (e.g., the distance from the light source 130, 230 to the screen 110, 210), etc.

The nanoparticles may also deposited in different layers, which may be separated by additional substrates, and/or deposited to form a particular pattern or set of patterns (e.g., in the shape(s) of text or images) when viewed along the display's optical axis. The light source(s) may also be disposed to illuminate the some or all of the screen with one or more diverging IR or UV beams. Illuminating the screen with the diverging beam(s) causes images to appear on the screen in the shape(s) of the pattern(s) formed by the nanoparticles. The diverging beams can be turned on and off (modulated) to produce images that appear to flicker, move, change color, etc. as desired.

Upconverting Nanoparticles

As explained above, nanoparticles suitable for use in up-converting transparent displays may be of any suitable shape, including but not limited to spheres, ellipsoids, oblate spheroids, and prolate spheroids. They may be solid particles made of a single material (e.g., a rare earth material, such as praseodymium, erbium, thulium, europium, cerium, and terbium) or a combination of materials (e.g., rare-earth metals, dielectric materials, and/or metals). In some cases, they may include hollow particles with cavities designed to act as resonant cavities, with nearly 100% sum-frequency generation efficiency. This can be achieved with $\chi^{(2)}$ nonlinear material under certain conditions. The nanoparticles may have outer diameters that range from about 5 nm to about 250 nm (e.g., 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, or 95 nm, 100 nm, 125 nm, 150 nm, 175 nm, 200 nm, or 225 nm). The nanoparticles' exact shape, size, and composition may depend on the desired frequency conversion properties.

Figure 5B:
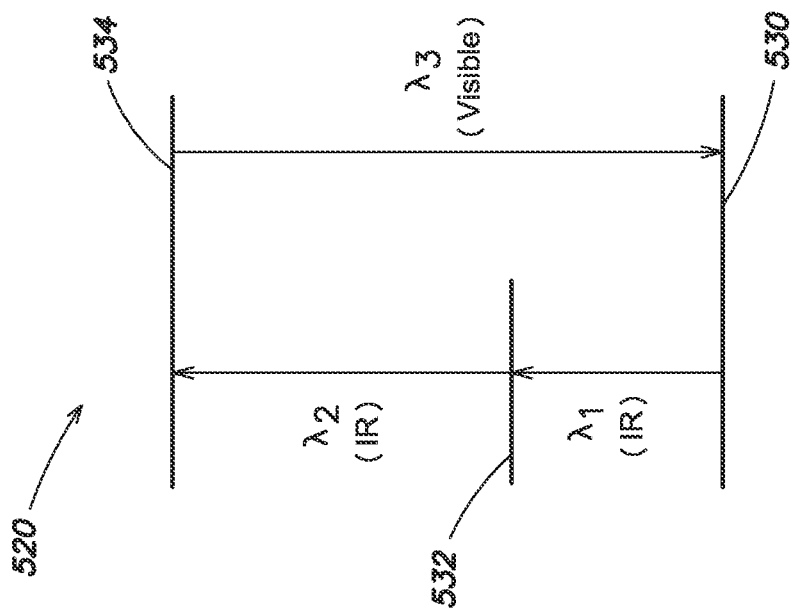
FIG. 5B shows an energy level diagram of a frequency-summing nanoparticle suitable for use in the transparent displays of FIGS. 2 and 3.
Figure 5A:
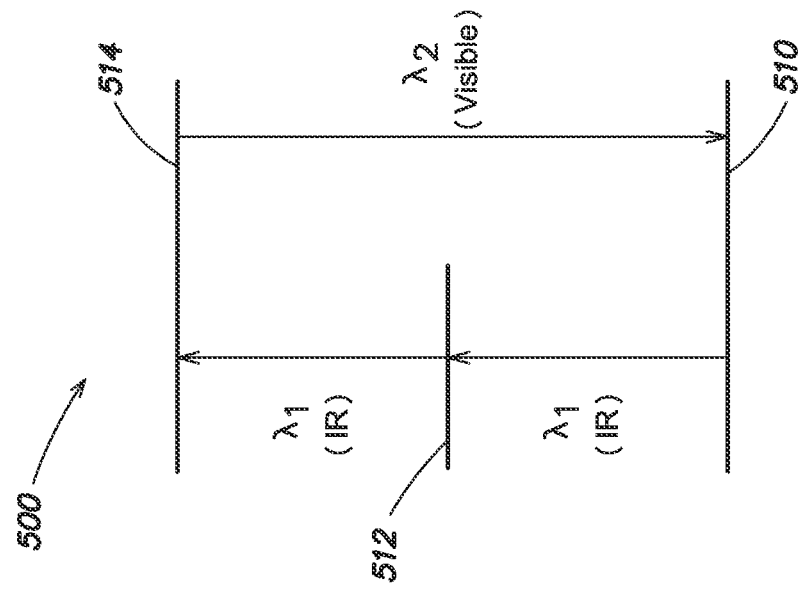
FIG. 5A shows an energy level diagram of a frequency-doubling nanoparticle suitable for use in the transparent display of FIG. 1.

FIGS. 5A and 5B are energy level diagrams for nanoparticles suitable for use in transparent scatting displays. More specifically, FIG. 5A shows an energy level diagram 500 for a frequency-doubling nanoparticle. Absorption of a first photon at an infrared wavelength $\lambda_1$ excites the frequency-doubling nanoparticle from a ground state 510 to a metastable state 512. Absorption of a second photon at the same IR wavelength $\lambda_1$ excites the frequency-doubling nanoparticle from the metastable state 512 to a higher excited state 514. The excited frequency-doubling nanoparticle decays back to the ground state 510 with spontaneous emission at a visible wavelength $\lambda_2$. Similarly, FIG. 5B shows an energy level diagram 520 for a frequency-summing nanoparticle. Absorption of a first photon at a first infrared wavelength $\lambda_1$ excites the frequency-summing nanoparticle from a ground state 530 to a metastable state 532. Absorption of a second photon at the different IR wavelength $\lambda_2$ excites the frequency-summing nanoparticle from the metastable state 532 to a higher excited state 534. The excited frequency-summing nanoparticle decays back to the ground state 510 with spontaneous emission at a visible wavelength $\lambda_3$.

Making a Transparent Scattering Display

Figure 6A:
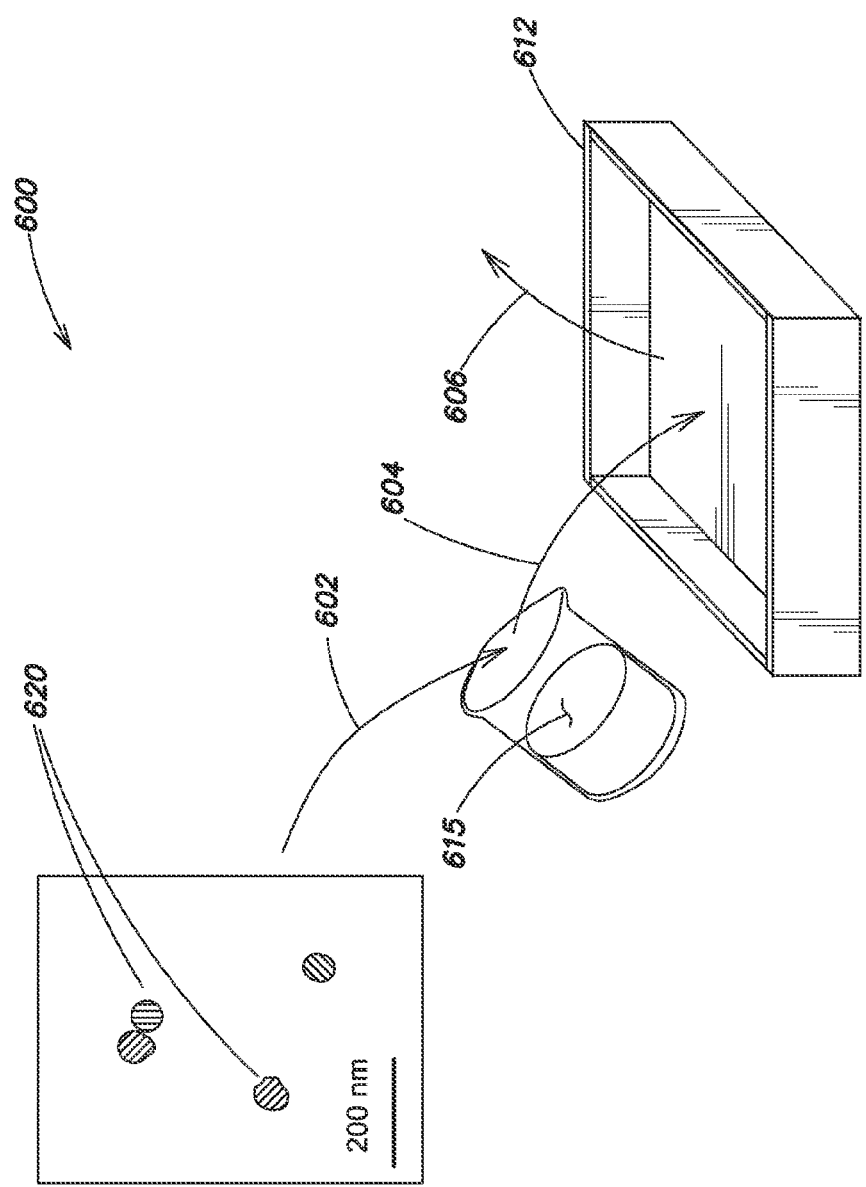
FIG. 6A illustrates a process for making a transparent screen with upconverting nanoparticles.
Figures 6B, 6C:
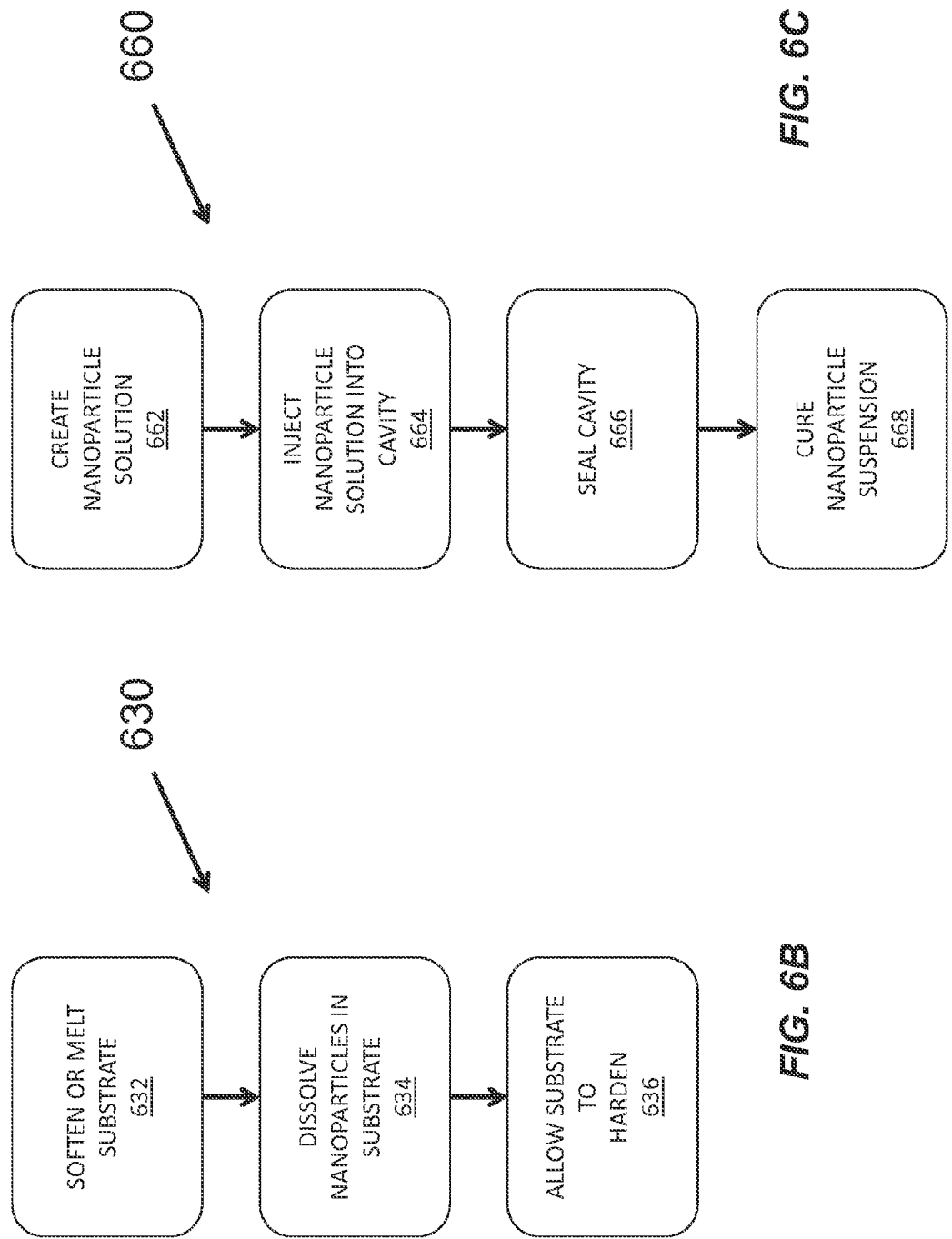
FIGS. 6B and 6C are flowcharts that illustrate different processes for making transparent screens with upconverting nanoparticles.

FIGS. 6A-6C illustrate different processes for making screens with scattering nanoparticles for use in transparent scattering displays, e.g., as shown in FIGS. 1-4. The nanoparticles 620 may have shapes, sizes, and/or compositions selected to provide nonlinear frequency conversion to particular wavelengths (e.g., wavelengths corresponding to red, blue, and green). The nanoparticles 620 can also be synthesized with existing techniques including but not limited to wet chemistry, physical vapor deposition, ion implantation, and fiber drawing. If desired, the nanoparticles' outer surfaces can be treated (e.g., with polyvinylpyrrolidone (PVP)) to prevent undesirable aggregation (clustering, described below), chemical reactions with the host (substrate) material, or both. The nanoparticle solution may be diluted to a reduce the nanoparticle concentration, to improve the coating's deposition characteristics, or both.

The process 600 shown in FIG. 6A involves dissolving nanoparticles 620 in an appropriate solvent 615, such as polyvinyl alcohol (PVA), which dissolves in water, to form a nanoparticle solution (step 602). If desired, the nanoparticle solution can be mixed with a polymer powder to form a polymer/nanoparticle solution. Alternatively, the nanoparticles can also be dissolved into a liquid polymer matrix to form a polymer/nanoparticle solution that is deposited onto one surface of a transparent substrate 612 and allowed to dry slowly.

The nanoparticles can be coated onto the transparent substrate 612, which can made of glass, plastic, acrylic, or any other suitable transparent material, by depositing the nanoparticle solution onto the substrate's surface (step 604). Making the coating uniform, both in thickness and surface appearance, may reduce or eliminate undesired scattering. To achieve a uniform thickness, the nanoparticle solution may be spin-coated, painted, or otherwise deposited onto the substrate's surface to form the coating. For example, the nanoparticle solution may be painted onto the substrate in the form of liquid, foam, or spray. Such paint can be sprayed onto a transparent surface, without the need for any special facility, and so can be done easily at almost any occasion. If desired, another transparent substrate (not shown) may be placed or pressed onto the coated surface of the first substrate 612 to remove bubbles in the coating, reduce the coating's surface roughness, or both. The coating is allowed to dry (step 606) through gentle evaporation (e.g., via desiccation in a vacuum chamber) to form a uniform surface. If desired, additional coats (e.g., containing different types of nanoparticles) may be deposited onto the dried coating or onto other substrate surfaces.

In some cases, the nanoparticle solution is printed onto the substrate surface to produce a uniform layer of nanoparticles. Suitable printing techniques include but are not limited to screen printing, inkjet printing, rotogravure printing, and flexography printing. Printing is particularly useful for depositing nanoparticles onto flexible substrates.

If desired, the nanoparticle solution may be printed or other otherwise deposited onto predetermined portions of the substrate surface, using a mask or other appropriate technique. For instance, if the nanoparticle solution is an aqueous solution, the substrate surface may be selectively coated with hydrophilic and/or hydrophobic coatings to attract and repel, respectively, the nanoparticle solution.

FIG. 6B illustrates another process 630 for making a screen suitable for use in a transparent display. In this process 630, the substrate is softened to form a softened substrate or melted to form a liquid substrate (step 632). The nanoparticles are pressed into the softened substrate or dissolved into the liquid substrate (step 634), then allowed to harden into a screen that includes nanoparticles embedded within the substrate (step 636). For instance, the nanoparticles can be dissolved directly into molten glass, molten/liquid plastic, or molten/liquid acrylic to form a doped substrate material. The doped substrate material can then be extruded, molded, or otherwise formed into a transparent board doped with nanoparticles using standard glass (or plastic) making techniques.

FIG. 6C illustrates yet another process 660 for making a screen suitable for use in a transparent display. In this process 660, one or more nanoparticles are suspended in a liquid polymer matrix or mixed with a dry polymer and a solvent to form a nanoparticle suspension (step 662). In step 664, the nanoparticle suspension is injected or wicked into a cavity formed between a pair of substrates or within a single substrate, e.g., using capillary action. The cavity is sealed in step 666 to prevent the suspension from escaping, and the nanoparticle suspension is cured in step 668, e.g., using ultraviolet light, to prevent the nanoparticles from settling.

Nanoparticle Clustering

In some cases, the nanoparticles in solution can cluster together to produce undesired shifts in the emission wavelength. Without being bound by any particular theory, it appears that osmotic pressure, capillary forces, and van der Waals forces could each play a role in nanoparticle clustering. Osmotic pressure yields short-range (sticking) attraction, but may not apply in solvents with relatively low nanoparticle concentrations (e.g., volume fractions of about $2 \times 10^{-5}$ or less). Capillary forces can be reduced or eliminated by lowering the interfacial energy between the nanoparticle surface and the solvent (e.g., PVA), for example, by coating the particles with a polar coating like PVP.

Van der Waals forces may be more likely to cause clustering than osmotic pressure or capillary forces. The potential energy associated with the van der Waals force for a pair of spheres with radius R and separated by a distance D is $$W(D) = -AR/(12D),$$

where A is a constant. For silver nanospheres in water, $A = 4 \times 10^{-19}$, which, at a separation distance D=200 nm, corresponds to an attractive energy roughly equal to kT (Boltzmann's constant times temperature, or the thermal excitation energy). Decreasing the nanosphere density reduces the probability that a given pair of nanospheres will be separated by 200 nm or less, which in turn reduces the probability that van der Waals attraction will lead to clustering:

| Nanosphere Density | Probability of <200 nm Nearest Neighbor |
|---|---|
| 2.0 µg/L | 1.7% |
| 1.0 µg/L | 0.8% |
| 0.5 µg/L | 0.4% |

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, the embodiments (e.g., of designing and/or operating transparent displays) may be implemented using hardware, software, or a combination thereof. When implemented in software, the software code can be executed on any suitable processor or collection of processors, whether provided in a single computer or distributed among multiple computers.

Further, it should be appreciated that the present displays and methods of making and operating displays may be used in conjunction with a computer, which may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices, including one or more displays as disclosed herein. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of and "consisting essentially of shall be closed or semi-closed transitional phrases, respectively, as set forth in the United States Patent Office Manual of Patent Examining Procedures, Section 2111.03.

What is claimed is:

1. A display comprising:
  a transparent substrate;
  at least one nanoparticle disposed on the transparent substrate, the at least one nanoparticle comprising a resonant structure configured to resonate at a visible wavelength $\lambda_v=(\lambda_1\lambda_2)/(\lambda_1+\lambda_2)$ in response to illumination at a first wavelength $\lambda_1$ and a second wavelength $\lambda_2$;
  a first light source, in optical communication with the at least one nanoparticle, to illuminate the at least one nanoparticle with a first infrared beam at the first wavelength $\lambda_1$; and
  a second light source, in optical communication with the at least one nanoparticle, to illuminate the at least one nanoparticle with a second infrared beam at the second wavelength $\lambda_2$ while the first light source illuminates the at least one nanoparticle with the first infrared beam so as to cause the at least one nanoparticle to emit visible light,
  wherein the visible light emitted by the at least one nanoparticle is at the visible wavelength $\lambda_v=(\lambda_1\lambda_2)/(\lambda_1+\lambda_2)$.

2. The display of claim 1, wherein the transparent substrate has a transmittance of about 90% to about 100% at wavelengths from about 390 nm to about 760 nm.

3. The display of claim 1, wherein the transparent substrate comprises at least one of glass, plastic, polymer, and acrylic.

4. The display of claim 1, wherein the at least one nanoparticle comprises a rare-earth element to emit the visible light in response to absorption, by the at least one nanoparticle, of at least a portion of the first infrared beam and at least a portion of the second infrared beam.

5. The display of claim 4, wherein the rare-earth metal comprises at least one of erbium, thulium, europium, cerium, and terbium.

6. A display comprising:
  a transparent substrate;
  at least one nanoparticle disposed on the transparent substrate, the at least one nanoparticle comprising a resonant structure;
  a first light source, in optical communication with the at least one nanoparticle, to illuminate the at least one nanoparticle with a first infrared beam at a first infrared wavelength $\lambda_1$; and
  a second light source, in optical communication with the at least one nanoparticle, to illuminate the at least one nanoparticle with a second infrared beam at a second infrared wavelength $\lambda_2$ while the first light source illuminates the at least one nanoparticle with the first infrared beam so as to cause the at least one nanoparticle to emit visible light,
  wherein the at least one nanoparticle comprises at least one of:
  at least one first nanoparticle to emit light at a first visible wavelength between about 390 nm and about 490 nm;
  at least one second nanoparticle to emit light at a second visible wavelength between about 490 nm and about 580 nm; and
  at least one third nanoparticle to emit light at a third visible wavelength between about 580 nm and about 760 nm.

7. The display of claim 6, further comprising:
  at least one third light source, in optical communication with the transparent substrate, to illuminate the at least one second nanoparticle with a third infrared beam at a third infrared wavelength $\lambda_3$; and
  at least one fourth light source, in optical communication with the transparent substrate, to illuminate the at least one third nanoparticle with a fourth infrared beam at a fourth infrared wavelength $\lambda_4$.

8. The display of claim 1, wherein the transparent substrate at least partially defines a cavity and the at least one nanoparticle comprises a plurality of nanoparticles, and further comprising:
  a fluid, disposed within the cavity, in which the plurality of nanoparticles is suspended; and
  a circulation system, in fluid communication with the fluid, to circulate the fluid so as to evenly distribute the plurality of nanoparticles within the cavity.

9. A display comprising:
  a transparent substrate;
  at least one nanoparticle disposed on the transparent substrate, the at least one nanoparticle comprising a resonant structure;
  a first light source, in optical communication with the at least one nanoparticle, to illuminate the at least one nanoparticle with a first infrared beam at a first wavelength $\lambda_1$; and
  a second light source, in optical communication with the at least one nanoparticle, to illuminate the at least one nanoparticle with a second infrared beam at a second wavelength $\lambda_2$ while the first light source illuminates the at least one nanoparticle with the first infrared beam so as to cause the at least one nanoparticle to emit visible light,
  wherein the transparent substrate at least partially defines a cavity and the at least one nanoparticle comprises a plurality of nanoparticles, and further comprising:
  a fluid, disposed within the cavity, in which the plurality of nanoparticles is suspended;
  a circulation system, in fluid communication with the fluid, to circulate the fluid so as to evenly distribute the plurality of nanoparticles within the cavity, and
  wherein the fluid comprises at least one of air and a liquid.

10. The display of claim 1, wherein:
  the first light source is configured to transmit the first infrared beam toward the at least one nanoparticle in a first direction substantially orthogonal to an optical axis of the transparent substrate, and
  the second light source is configured to transmit the second infrared beam toward the at least one nanoparticle in a second direction substantially orthogonal to the optical axis of the transparent substrate.

11. The display of claim 10, wherein the first direction is substantially orthogonal to the second direction.

12. The display of claim 1, wherein the first wavelength is the same as the second wavelength.

13. The display of claim 1, wherein the first wavelength is greater than the second wavelength.

14. The display of claim 1, further comprising:
   a reflective layer, disposed on one side of the transparent substrate, to reflect at least a portion of the visible light emitted by the at least one nanoparticle in a direction of a viewer.

15. A method of operating a display comprising at least one nanoparticle disposed on a transparent substrate, the method comprising:
   (A) generating a first infrared beam at a first wavelength $\lambda_1$;
   (B) generating a second infrared beam at a second wavelength $\lambda_2$;
   (C) illuminating the at least one nanoparticle with the first infrared beam and the second infrared beam so as to cause the at least one nanoparticle to emit visible light at a visible wavelength $\lambda_v=(\lambda_1\lambda_2)/(\lambda_1+\lambda_2)$ in a direction of a viewer, the at least one nanoparticle comprising a resonant structure configured to resonate at the visible wavelength $\lambda_v$.

16. The method of claim 15, wherein the first wavelength is the same as the second wavelength.

17. The method of claim 15, wherein the first wavelength is greater than the second wavelength.

18. The method of claim 15, wherein (C) comprises:
   (i) transmitting the first infrared beam toward the at least one nanoparticle in a first direction substantially orthogonal to an optical axis of the transparent display; and
   (ii) transmitting the second infrared beam toward the at least one nanoparticle in a second direction substantially orthogonal to the optical axis of the transparent display.

19. The method of claim 18, wherein the first direction is substantially orthogonal to the second direction.

20. The method of claim 15, wherein the at least one nanoparticle comprises a first nanoparticle disposed at a first location of the transparent substrate and a second nanoparticle disposed at a second location of the transparent substrate, and further comprising:
   illuminating the first nanoparticle with the first infrared beam at the first wavelength $\lambda_1$ and the second infrared beam at the second wavelength $\lambda_2$ so as to cause the first nanoparticle to emit visible light at the visible wavelength $\lambda_v$ in the direction of the viewer; and
   illuminating the second nanoparticle with the first infrared beam at the first wavelength $\lambda_1$ and the second infrared beam at the second wavelength $\lambda_2$ so as to cause the second nanoparticle to emit visible light at the visible wavelength $\lambda_v$ in the direction of the viewer.

21. The method of claim 15, wherein the at least one nanoparticle comprises a first nanoparticle and a second nanoparticle, and further comprising:
   illuminating the first nanoparticle with the first infrared beam at the first wavelength $\lambda_1$ and the second infrared beam at the second wavelength 2 so as to cause the first nanoparticle to emit visible light at the visible wavelength $\lambda_v$ in the direction of the viewer; and
   illuminating the second nanoparticle with a third infrared beam at a third wavelength $\lambda_3$ and a fourth infrared beam at a fourth wavelength $k_4$ so as to cause the second nanoparticle to emit visible light at a visible wavelength $\lambda_{vv}=(\lambda_3\lambda_4)/(\lambda_3+\lambda_4)$ in the direction of the viewer.

22. The method of claim 15, wherein the transparent substrate at least partially defines a cavity and the at least one nanoparticle comprises a plurality of nanoparticles suspended in a fluid disposed within the cavity, and further comprising:
   circulating the fluid so as to evenly distribute the plurality of nanoparticles within the cavity.

23. A method of making a display, the method comprising:
   (A) providing at least one nanoparticle that emits visible light when illuminated by infrared light, the at least one nanoparticle comprising a resonant structure;
   (B) providing a substrate having a transmittance of about 90% to about 100% from about 390 nm to about 760 nm;
   (C) depositing the at least one nanoparticle on the substrate;
   (D) aligning a first infrared beam to illuminate the at least one nanoparticle in a first direction substantially orthogonal to an optical axis of the substrate; and
   (E) aligning a second infrared beam to illuminate the at least one nanoparticle in a second direction substantially orthogonal to the optical axis of the substrate,
   wherein (C) comprises:
   (i) melting the substrate to form a liquid substrate;
   (ii) dissolving the at least one nanoparticle into the liquid substrate; and
   (iii) allowing the liquid substrate to harden so as to fix the at least one particle to or at least partially within the substrate.

24. The method of claim 23, wherein (C) comprises depositing plural nanoparticles on the substrate in a predetermined pattern.

25. A method of making a display, the method comprising:
   (A) providing at least one nanoparticle that emits visible light when illuminated by infrared light, the at least one nanoparticle comprising a resonant structure;
   (B) providing a substrate having a transmittance of about 90% to about 100% from about 390 nm to about 760 nm;
   (C) depositing the at least one nanoparticle on the substrate;
   (D) aligning a first infrared beam to illuminate the at least one nanoparticle in a first direction substantially orthogonal to an optical axis of the substrate; and
   (E) aligning a second infrared beam to illuminate the at least one nanoparticle in a second direction substantially orthogonal to the optical axis of the substrate,
   wherein (C) comprises:
   (i) suspending the at least one nanoparticle in a fluid to form a nanoparticle suspension; and
   (ii) sealing the nanoparticle suspension within a cavity at least partially defined by the substrate.

26. The display of claim 1, wherein the resonant structure defines a resonant cavity.

27. The display of claim 1, wherein the resonant structure comprises a solid particle coated with a nonlinear material.

* * * * *